United States Patent [19]

Morris

[11] 4,199,052

[45] Apr. 22, 1980

[54] CONVEYOR ROLLER WHEEL ASSEMBLY

[75] Inventor: James C. Morris, Twinsburg, Ohio

[73] Assignee: Mayfran, Div. of Fischer Industries, Cleveland, Ohio

[21] Appl. No.: 20,430

[22] Filed: Mar. 14, 1979

Related U.S. Application Data

[63] Continuation-in-part of Ser. No. 823,178, Aug. 9, 1977, abandoned.

[51] Int. Cl.² ........................ B65G 45/02; B61F 17/00
[52] U.S. Cl. ..................................... 198/500; 198/845; 308/36.1; 308/101; 308/187
[58] Field of Search ........................ 198/500, 501, 845; 308/18, 20, 36.1, 92, 93, 98, 101, 103, 106, 107, 108, 187, 187.1; 294/44; 277/32, 56

[56] References Cited
U.S. PATENT DOCUMENTS

| | | | |
|---|---|---|---|
| 4,005,915 | 2/1977 | Canfield | 295/44 X |
| 4,049,308 | 9/1977 | Martin | 308/101 X |
| 4,101,180 | 7/1978 | Anderson et al. | 308/20 |

Primary Examiner—Jeffrey V. Nase
Attorney, Agent, or Firm—Meyer, Tilberry & Body

[57] ABSTRACT

A conveyor roller wheel assembly comprising a roller member rotatably mounted on a hub member, as by means of a plain journal bearing or by rolling elements such as ball or roller bearings, between inner and outer seal flanges on the hub member, the hub member having a portion of reduced diameter between its ends and a lubrication passageway extending from an end face of the hub member and communicating with its reduced diameter portion through a surface thereof. Facing side surfaces of the roller member and seal flanges are shaped to define annular labyrinth seal passageways therearound of restricted cross section and of tortuous configuration radially of the conveyor wheel. One or more of the wheel assembly members may be constituted of moldings of sintered powered metal.

42 Claims, 9 Drawing Figures

CONVEYOR ROLLER WHEEL ASSEMBLY

BACKGROUND OF THE INVENTION

This is a continuation-in-part of application Ser. No. 823,178, filed Aug. 9, 1977, now abandoned.

One of the major problems encountered in the use of conveyor belts such as apron conveyors in the handling of bulk material has been the high maintenance costs and down time occasioned by the rapid wear of the conveyor wheel bearings when handling abrasive materials such as sand, gravel, ash, cement and foundry dust, and corrosive materials and the like. The abrasive materials work their way into and abrade the bearing surfaces of the conveyor wheels, causing rapid wear thereof such as necessitates early replacement of the wheels which then results in frequent conveyor down time. The extent of this problem will be appreciated when it is considered that many of these conveyor belts are equipped with up to hundreds of these conveyor wheels, thus magnifying the problem of rapid conveyor wheel wear and required replacement thereof.

To minimize such conveyor wheel wear and reduce conveyor maintenance costs and down time, these conveyor wheels have been customarily provided in the past with lubricant supply passageways through which lubricant is introduced and supplied to the wheel bearings. The provision of such lubricant supply passageways in prior type conveyor wheels has generally required, however, the performance of a number of machining operations on the wheel components such as add materially to their cost of manufacture.

Prior type conveyor wheels also have been customarily provided with various types of seals for preventing the ingress into the wheels and their bearings of abrasive or other type materials from the surrounding environment so as to thereby reduce the rate of bearing wear and maintain the wheels in proper operating condition. Among the various seals employed for this purpose have been so-called labyrinth seals in the form of annular passageways of restricted cross section extending around the wheel roller at each side thereof outwardly of its bearing surfaces and formed of tortuous configuration radially of the conveyor wheel, the passageways being filled with lubricating grease which iself forms the sealing media acting to seal off the wheel bearings from the outside. These labyrinth seal design conveyor wheels, however, have been customarily composed of a considerable number of separate parts or components requiring a considerable number of machine and assembly operations, all of which adds up to a relatively high manufacturing cost for such wheels.

SUMMARY OF THE INVENTION

The present invention contemplates a conveyor roller wheel assembly which overcomes the above referred to problems and provides a self-contained unitary wheel assembly of simple and low cost construction composed of a minimum number of component parts and requiring a minimum number of machining and assembling operations.

Briefly stated, in accordance with one aspect of the invention a conveyor wheel having a roller member rotatably mounted on a hub member between seal flanges thereon has its hub member formed with a reduced diameter portion and provided with a lubrication passageway extending from an end face of the hub member and communicating with its reduced diameter portion through a surface thereof.

According to a further aspect of the invention, the roller and side seal flanges of the conveyor wheel are shaped to themselves form, when assembled, annular labyrinth seal passageways therebetween of restricted cross section located outwardly of the wheel bearings at each side thereof and of tortuous configuration radially of the wheel and which are adapted to be filled with viscous lubricating material which itself forms the sealing media acting to seal off the wheel bearings from the outside.

According to a still further aspect of the invention, the conveyor wheel is comprised solely of a roller member, a flanged hub member, and an inner cap seal flange member all of which members are constituted of moldings of powdered sintered metal and the facing sides of the roller member and seal flanges of which have cooperating annular grooves and ribs molded thereinto which loosely interfit to form the labyrinth seal passageways therebetween.

Another object of the invention is to provide a conveyor roller wheel assembly of the above mentioned character, the roller and side seal flange members of which themselves form labyrinth seals for sealing off the wheel bearings from the outside.

A further object of the invention is to provide a conveyor roller wheel assembly of the above mentioned character, the component members of which are all constituted of moldings of sintered powdered metal and the roller and side seal flange members of which have surfaces molded thereinto which loosely fit together during wheel assembly to form labyrinth seals for the wheel bearings A still further object of the invention is to provide a conveyor roller wheel assembly of the above mentioned character having its roller member rotatably mounted on the hub member by interengaged plain journal bearing surfaces thereof which are stepped to a different size intermediate their ends to form axial spaced annular step shoulders defining an annular lubrication passageway between the bearing surfaces.

Still another object of the invention is to provide a conveyor roller wheel assembly of the above mentioned character having its roller member rotatably supported on the hub member by anti-friction bearings such as ball or tapered roller bearings.

Further objects and advantages of the invention will appear from the following detailed description thereof and from the accompanying drawings.

DESCRIPTION OF THE PREFERRED EMBODIMENTS

Figures 1, 2, 3:
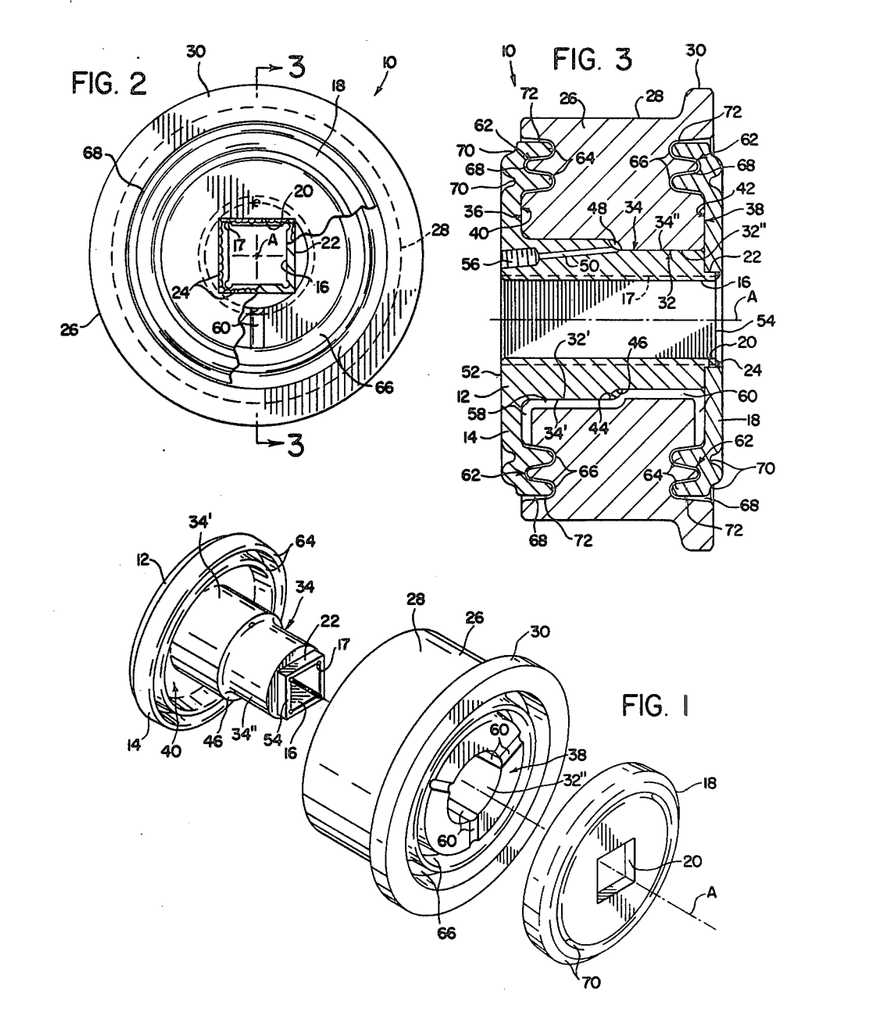
FIG. 1 is an exploded perspective view of one form of conveyor roller wheel assembly comprising the invention.
FIG. 2 is an elevation view of the inner or cap seal flange end of the conveyor roller wheel assembly shown in FIG. 1 with portions thereof broken away and shown in section.
FIG. 3 is an axial section taken on the line 3—3 of FIG. 2.

Referring to FIGS. 1-3, the conveyor roller wheel assembly 10 there shown comprises a hub or journal member 12 provided at one end with an outturned flange 14 disposed normal to the hub axis A which flange, as shown, is formed as an integral part of the hub member and serves as the outer seal flange of the wheel assembly. The hub member 12 is provided with an axial mounting hole 16 therethrough for receiving and mounting the wheel assembly on a respective support rod (not shown) of a conveyor belt. The mounting hole 16 is, in most instances, formed of non-circular cross section such as square, as shown, or of octagonal, hexagonal, D or dual D shape, etc., so as to be self-keying on its support rod. However, in roller wheel assembly designs where some rotation of the journal or hub member 12 can be tolerated, the mounting hole 16 may in such case be formed of circular cross section. To assure an easy sliding fit of the hub member 12 over the respective conveyor wheel support rod of the conveyor belt, where the mounting hole 16 is of square or other non-circular shape characterized by sharply convergent sides, the hub member in such case is preferably provided with suitable reliefs 17 at the corners of the square or other non-circular shaped mounting hole 16, as shown in FIG. 2.

Suitably fastened on the other or inner end of the hub member 12 so as to be non-rotatable and axially fixed thereon is an inner cap or seal flange member 18 disposed normal to the hub axis A and opposed to the outer seal flange 14. The inner seal flange 18 is formed with an axial opening 20 which, in the particular case illustrated, is of square configuration for fitting snugly over a corresponding square shaped inner end shoulder portion 22 of the hub member 12 which end shoulder 22 preferably matches the square shaped bore opening 16 of the hub member. The inner seal flange 18 is suitably secured in place on the shouldered end 22 of the hub member 12 as by welding or brazing it thereto around its full annular extent to form an annular fillet weldment 24 (FIG. 3) which also serves as an effective grease seal between the hub member and the inner seal flange 18. The square-shaped snug interfit 20, 22 between the hub and cap seal flange members 12, 18, together with the annular weldment 24 holding the cap seal flange member 18 against the shoulder formed on the hub member by the shouldered end portion 22 thereof, thus form interengaging means on the hub and cap seal flange members acting to lock them together in fixed predetermined axial relation against both axial and rotative movement relative to one another and completes the assembly of the hub and cap seal flange members 12, 18 with a roller member 26 to form the completed self-contained unitary roller wheel assembly 10.

Rotatably mounted on the hub member 12 between the two side seal flanges 14 and 18 thereon is the roller member 26 having an annular tread surface 28 concentric with the wheel axis A and provided at its inner end with a flange 30. The roller member 26 is formed with an axial center bore opening 32 therethrough of circular cross section concentric with the wheel axis A and forming, in this embodiment of the invention, the journal bearing surface of the roller member. The roller member 26 is journaled, by means of its journal bearing surface 32, for rotation on the journal bearing surface 34 of the hub member 12. The opposite annular side face portions 36 and 38, respectively, of the roller member 26 which lie immediately contiguous and border the journal bearing surface 32 and are disposed normal to the axis thereof, bear against cooperating annular bearing surface portions 40 and 42, respectively, formed on the inwardly facing sides of the seal flanges 14 and 18 to thereby provide end thrust bearings for the roller member 26 serving to restrain it against endwise or axial movement on the hub member 12 and thus maintain it in fixed axial relation to the seal flanges 14 and 18. As shown, the cooperating journal bearing surfaces 32 and 34, in this form of the invention, are stepped down or offset at points more or less midway between the opposite ends of the bearing surfaces, as indicated at 44 and 46, respectively, to form outer and inner offset bearing surface portions 32', 32" and 34', 34" on the roller 26 and hub 12, respectively, of two different (e.g., ¼ inch different) diameters and of more or less equal length axially of the wheel assembly 10, the outer bearing surface portions 32' and 34' adjacent the flanged end 14 of the hub member preferably being the larger in diameter. The annular offset or step shoulders 44, 46 may be either formed of concavely dished shaped as shown in FIG. 3, or located a slight axial distance apart, or both of these features may be utilized, to thereby form an annular passageway 48 between the two journal bearing surfaces 32 and 34 to serve as a reservoir for bearing lubrication grease. A lubrication hole or passageway 50 is drilled into the hub member 12 from one or the other of its end faces 52 or 54, preferably as shown from the outer end face 52 at the flanged end 14 of the hub member, and in a direction generally parallel or slightly inclined to the axis A thereof, to intersect and open into the annular lubrication reservoir passageway 48 at the surface of the step shoulder or offset 46 in the bearing surface 34 so as to be in communication therewith. The passageway 50 is formed with an enlarged outer end 56 which is screw threaded or otherwise formed with suitable connector means to receive a grease fitting (not shown) for the wheel assembly 10.

In the use of the conveyor wheel assembly 10 when installed in place in a conveyor belt, a viscous lubricant material such as lubricating grease is initially forced under pressure, by a lubricant grease gun connected to the grease fitting 56 at the outer end of the supply passageway 50, into and through the supply passageway 50 and into the annular lubricant reservoir passageway 48 between the cooperating journal bearing surfaces 32 and 34 of the roller member 26 and hub member 12 so as to completely fill the reservoir passageway 48 and be forced from this passageway out between the cooperating journal bearing surfaces 32 and 34 as well as between the respective cooperating side or end thrust bearing surfaces 36, 40 and 38, 42 of the roller member 26 and side seal flanges 14 and 18 so as to effectively lubricate all these bearing surfaces, thus affording free and easy rotation of the roller member 26 on the hub member 12. Lubrication of the conveyor wheel bearing surfaces 36, 40 and 38, 42 in this manner is repeated as often as needed during the use of the conveyor belt in order to maintain the roller member 26 in free running condition and purge the bearing surfaces of abrasive material such as would otherwise cause undue wear of these surfaces. To facilitate the flow of the lubricant out of the annular lubricant reservoir passageway 48 and out between the journal bearing surfaces 32, 34 and side or end thrust bearing surfaces 36, 40 and 38, 42, the roller member 26 is provided with one or more (three in the particular case illustrated) lubricant feeder passageways 58 and 60 in its journal bearing surface 32 and spaced equidistant therearound and respectively extending endwise thereof in opposite directions from the annular reservoir passageway 48 to the respective side bearing surfaces 38, 36 of the roller member and thence radially outward thereof across these side bearing surfaces.

To minimize the ingress into the bearing surfaces 32, 34 and 36, 40 and 38, 42 of abrasive material from the surrounding environment, the conveyor wheel assembly 10 is provided, in accordance with the invention, with so-called labyrinth seals 62 located on each side of the roller member 26 radially outwardly of the side or end thrust bearing surfaces 36, 40 and 38, 42 and providing a comparatively long path passageway normally filled with lubricant grease and through which any abrasive material must travel before it can reach the aforementioned bearing surfaces, the filling of lubricant grease itself constituting the sealing media. Because of the extended length of these labyrinth seals 62, a significant amount of time is required for the abrasive material to work its way through the filling of grease and reach the bearing surfaces. By relubricating the conveyor wheel 10 before any such abrasive materials can actually reach the bearing areas of the wheel, the lubricant "washes out" or purges whatever abrasive material is present in the labyrinth seals and so prevents such material from ever entering the wheel bearing areas. Conveyor wheels provided with such labyrinth seals thus require less frequent relubrication thereof to maintain them in proper operational condition, thereby lowering conveyor maintenance costs and reducing conveyor down time.

The particular type of labyrinth seals 62 employed in the conveyor wheel assembly 10 according to the invention are formed by providing the facing sides of the rolller member 26 and the respective seal flanges 14 and 18 with matching, i.e., complementary, loosely or spacially interfitting annular ribs 64 and grooves 66 located radially outward of the wheel 10 from the cooperating side bearing surfaces 36, 40 and 38, 42 thereof to form annular labyrinth seal passageways 68 therebetween of restricted cross section and of tortuous or sinuous like configuration radially of the conveyor wheel. In the particular case illustrated, two such matching or complementary annular ribs 64 and grooves 66 are provided at each side of the roller member 26 to form the labyrinth seal passageways 68. Preferably, the ribs 64 are provided on the seal flanges 14, 18 while the grooves 66 are provided in the roller member 26, as shown. Also, the seal flanges 14, 18 are provided with annular grooves 70 in their respective outer side faces opposite the annular ribs 64 thereon for the purpose of affording a more uniform wall thickness for the seal flanges 14, 18 throughout their radial extent. The annular labyrinth seal passageways 68 communicate therearound at their innermost ends with the radially extending portions of the lubricant feeder passageways 58, 60 in the roller member 26 and with the side bearing surfaces 36, 40 and 38, 42 between the roller member 26 and the seal flanges 14, 18 in order to thereby permit the flow of lubricant from these passageways 58, 60 into the labyrinth seal passageways 68 so as to completely fill them each time the conveyor wheel is lubricated. For the purposes of the invention, and as a specific but not necessarily limited example, the spacing of the annular ribs 64 from the grooves 66 to form the labyrinth seal passageways 68 in a conveyor wheel of five inch roller tread diameter may be of the order of 1/16" or so while the annular ribs 64 may have an average width of around ¼" or so and an average height of from ¼" to ⅜" or so, the annular grooves 66 being proportionately dimensioned to provide the 1/16" or so cross-sectional width of the labyrinth seal passageways 68. The fit or spacing between the annular ribs 64 and grooves 66 forming each of the labyrinth seal passageways 68 is preferably made significantly closer, e.g., around 1/32" spacing, at their outer edges, however, as indicated at 72 in FIG. 3, in order to reduce the possibility of contaminants entering the seal passageways 68. While the annular ribs 64 on each of the flanges 14, 18 are shown as being of substantially equal height, they may be made of different heights if desired, the mating grooves 66 being correspondingly dimensioned.

The formation of the labyrinth seals 62 in the above described manner, i.e., by shaping of the facing sides of the roller member 26 and seal flange members 14, 18 with the annular ribs 64 and grooves 66 which interfit in directions axially of these members, together with the absence of any need for maintaining any particularly close dimensional tolerances in the conveyor wheel components, makes it feasible to fabricate the individual components 12, 18 and 26 of the conveyor wheel assembly 10 by low cost conventional powder metallurgy processes wherein they are pressure molded of powder metal and the moldings sintered at elevated temperatures to form the finished product. Powder metal fabricated parts such as the components 12, 18 and 26 can be formed with sufficient accuracy to eliminate the need for machining any of the fits in the conveyor-wheel assembly 10. The exceptionally low cost of such powder metal fabricated components 12, 18 and 26, together with the need for only a single machining operation to be then performed on these components, i.e., the drilling of the lubricant supply hole 50 through the hub member 12, thus makes it possible to produce a labyrinth seal equipped conveyor roller wheel assembly 10 which is of significantly lower cost, e.g., as little as one-fourth the cost of present type labyrinth seal equipped conveyor wheel assemblies which are conventionally fabricated of machined steel components.

Accordingly, in view of the exceptionally low manufacturing cost and other important advantages realizable therefrom, one of more of the components 12, 18 and 26 of the conveyor wheel assembly 10 comprising the invention are preferably constituted of moldings of sintered powder metal that are produced by suitable well known powder metallurgy techniques. It should be understood, however, that the particular powder metal process employed to fabricate the components 12, 18 and 26 itself forms no part of the present invention. When the components 12, 18 and 26 are thus formed of such moldings, the facing sides 36, 40 and 38, 42 of these components are shaped, as molded, with the complementary annular ribs 64 and grooves 66 that form the annular labyrinth seal passageways 68 of the roller wheel assembly 10.

In the embodiment of FIGS. 1–3, the inner cap seal flange member 18 is welded to the hub member 12 as indicated at 24 so as to secure it thereon and form a grease seal therebetween. Accordingly the inner cap seal flange member 18 and hub member 12 are made of a sintered powder metal alloy suitable for welding such as, for example, an alloy composed of approximately 98% iron and 2% copper, with no carbon content. Also, the sides of the annular ribs 64 and grooves 66 on components 12, 18 and 26 are preferably tapered at a slight angle of around 5° or so relative to the axis of the conveyor wheel assembly so as to permit easy extraction of the powder metal molded components from their respective molding dies. Also in such case, the annular grooves 70 formed in the outside faces of the seal flanges 14 and 18 are so dimensioned as to produce, during the powder metal molding thereof, substantially the same degree of compression of the metal powder throughout these flanges.

Figure 4:
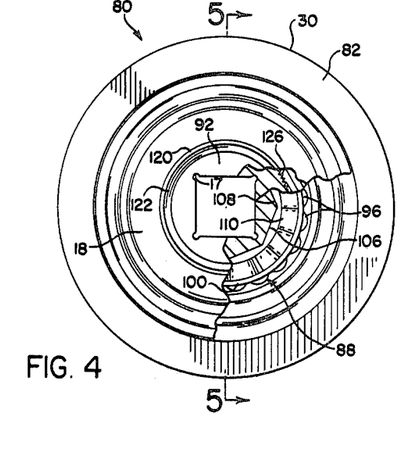
FIG. 4 is an elevation view similar to FIG. 2 but showing a modified form of the invention.
Figure 5:
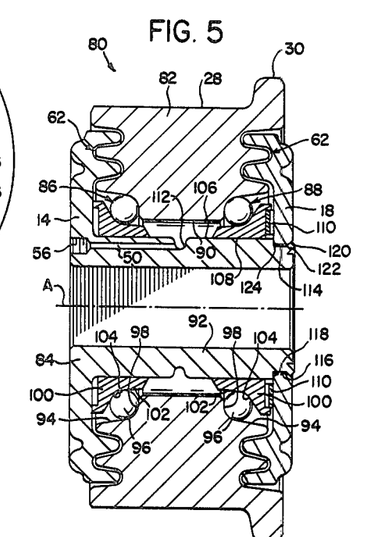
FIG. 5 is an axial section taken on the line 5—5 of FIG. 4.

Referring to FIGS. 4 and 5, the modified conveyor roller wheel assembly 80 therein illustrated differs from the wheel assembly 10 shown in FIGS. 1-3 mainly in that the roller member 82, in place of being journaled on the hub member 84 by means of the stepped cylindrical journal bearing surfaces 32, 34, is journaled instead on the hub member by means of rolling contact type, i.e., anti-friction bearings which employ rolling elements and which, as here shown, are in the form of ball bearings 86 and 88 which also provide end thrust bearings for the roller member. For this purpose, the axial center bore opening 90 of the roller member 82 is made of somewhat larger, e.g., around one-half inch or so larger diameter than the outside diameter of the sleeve portion 92 of the hub member 84 and is formed at its opposite ends with annular reliefs or grooves 94 extending therearound and serving as the outer ball races for the spherical metal balls 96 of the ball bearings 86, 88. The annular grooves or outer ball races 94 taper outwardly from inner annular shoulder end portions 98 which are arcurately shaped to match the curvature of the bearing balls 96 and form angle contact end thrust bearing surfaces on the roller member. The inner races of the ball bearings 86, 88 are constituted by ring members 100 slidably fitted on the sleeve portion 92 of the hub member 84 and the outer peripheries of which are formed with annular grooves 102 serving as the inner ball race bearing surfaces for the bearing balls 96. As shown, the annular grooves 102 are of shallow V shape inclined inwardly of the ring members 100 and having the base of the V arcuately shaped as indicated at 104 to match the curvature of the bearing balls 96 and form angle contact end thrust bearing or shoulder surfaces therefor.

The inner races or ring members 100 of the ball bearings 86, 88 are self-keyed to the sleeve portion 92 of the hub member 84 in a suitable manner so as to be non-rotatable but slidable thereon. To this end, the interengaging circumferential surfaces 106 of the sleeve portion 92 of the hub member 84 and 108 of the inner ball races 100 may be formed of matching octagonal shape as shown, or of any other suitable non-circular shape such as hexagonal, or of D shape characterized by matching flats on the hub member and inner race members 100, or by a tongue and groove or a splined interfit. To take up endwise variations or play in a direction axially of the conveyor wheel assembly 80 so as to produce a good rolling fit of the roller member 82 on, and maintain at all times proper end thrust bearing engagement thereof with the ball bearings 86, 88, a wave washer spring 110 is disposed on the inner end of the sleeve portion 92 of the hub member 84 and compressed between the inner race 100 of the inner ball bearing 88 and the inner cap seal flange 18.

In place of having the offset journal bearing portions 34', 34" to form the annular lubricant reservoir passageway 48 in FIGS. 1-3, the octagonal or other non-circular shaped outer peripheral surface 106 of the sleeve portion 92 of the hub member 84, in the modification illustrated in FIGS. 4 and 5, is formed instead as a straight surface of equal diametrical dimension throughout. An annular groove 112 is machined in the outer surface of the sleeve portion 92 more or less midway between its opposite ends to form a lubricant reservoir passageway or channel extending therearound and communicating with the space between the two axial spaced ball bearings 86, 88. As in FIGS. 1-3, a lubricant supply passageway 50 is drilled through the sleeve portion 92 of the hub member 84 from its flanged end 14 and in a direction generally parallel to the axis thereof to intersect and open into the peripheral lubricant reservoir groove 112 at the surface thereof so as to be in communication therewith. During lubrication of the modified conveyor wheel assembly 80, lubricant grease forced under pressure into the supply passageway 50 from its outer end 56 passes into and fills the annular groove 112 around the sleeve portion 92 of the hub member 84 as well as the annular space between the sleeve portion 92 and the wall of the center bore opening 90 in the roller member 92. From there, the lubrication grease is forced through the ball bearings 86, 88, between the bearing balls 96 thereof, so as to lubricate these bearings, and is further forced into the labyrinth seal passageways 68 so as to completely fill them and seal them off from the surrounding environment.

The form of the invention illustrated in FIGS. 4 and 5 also differs from that shown in FIGS. 1-3 in the manner of fastening of the inner cap seal flange 18 onto the inner end of the hub sleeve portion 92 and forming an effective grease seal therebetween. The inner cap seal flange 18 in FIGS. 4 and 5 is provided with a circular center bore opening 114 snugly fitted over the cooperating reduced diameter annular groove or end 116 on the inner end of the sleeve 92 of the hub member 84 forming an annular shoulder 118 therearound. The wall of the bore opening 114 in the seal flange 18 is chamfered or tapered outwardly at a suitable angle of, for example, 45° or so as shown at 120, and the inner end of the hub sleeve portion 92 is provided with a matching thin annular lip or ring portion 122 around its outer periphery which lip portion is swaged over the chamfered edge 120 of the seal flange 18 to clamp the flange tight against the annular shoulder 118, thus completing a permanent assembly of this flange on the hub member 84 and forming an effective seal therebetween for preventing the escape of lubricating grease at this point during the lubrication of the conveyor wheel assembly 80. The clamping of the inner cap seal flange member 18 to the hub member 12 also completes the assembly of the hub and cap seal flange members 12, 18 with the roller member 82 and ball bearings 86, 88 to form the completed self-contained unitary roller wheel assembly 80. To further insure against any such escape of lubricating grease at this point, a ring of suitable sealing compound such as either that commercially known as Loctite or silicone rubber, may be provided between the inner end of the opening 114 in the flange 18 and the annular shoulder 118 on the hub sleeve portion 92, as indicated at 124. Preferably, also, the center bore opening 114 of the inner seal flange 18 is serrated, as shown at 126 in FIG. 4, and press fitted onto the reduced diameter annular inner end 116 of the hub member 84 so as to bite or cut intermeshing serrations into the hub member, thereby providing an interlocking press fit acting to prevent rotation of the flange 18 on the hub member 84. To enable this cutting of the serrations into the hub member, it is made of dead soft powdered iron while the inner seal flange 18 is made of hardened powdered steel.

Figure 6:
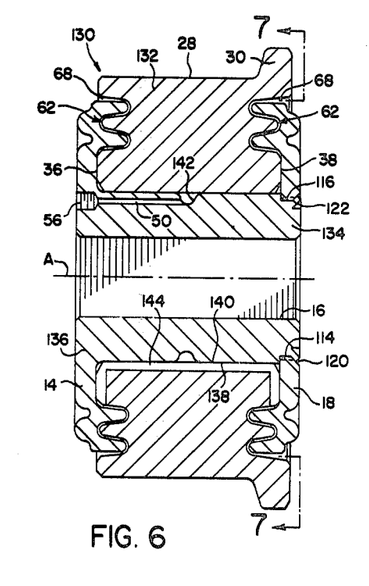
FIG. 6 is an axial section of another modified form of the invention.
Figure 7:
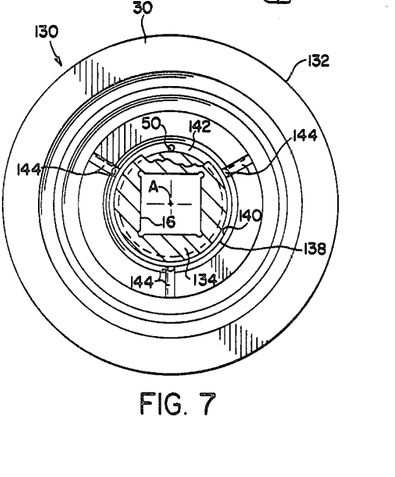
FIG. 7 is an elevation view partly in section on the line 7—7 of FIG. 6.

FIGS. 6 and 7 illustrate another form of conveyor roller wheel assembly 130 according to the invention which is of simpler and less expensive construction than the form of the invention shown in FIGS. 1–3 and which differs therefrom principally in that the journal bearing for the roller member 132 on the sleeve portion 134 of the hub member 136, rather than being of the stepped or offset form shown in FIGS. 1–3, is formed instead as a straight or plain cylindrical bearing comprised of cooperating cylindrical bearing surfaces 138 and 140 on the hub sleeve portion 134 and roller member 132, respectively. Also, in this modified form of the invention, the annular lubricant reservoir passageway extending around the journal bearing more or less midway between its opposite ends, in place of being formed by the spaced step shoulders 44, 46 of the offset roller journal bearing surfaces 32, 34 as in FIGS. 1–3, is constituted instead by an annular groove 142 formed in and extending around the cylindrical journal bearing surface 138 of the hub sleeve portion 134 more or less midway between its opposite ends. The groove 142 may be machined in the hub sleeve portion 134.

The hub member 136 is formed with the lubricant supply passageway or hole 50 extending generally parallel to the axis of the hub member and opening into the annular groove 142 through the wall thereof so as to communicate therewith. As in FIGS. 1–3, the roller member 132 is provided with one or more lubricant feeder passageways 144 in its journal bearing surface 140 spaced equidistant thereround and respectively extending along the length thereof to its opposite ends and thence radially outwardly thereof across the side bearing surfaces 36 and 38 of the roller member 132 and into communication with the inner ends of the labyrinth seal passageway 68. The inner cap seal flange 18, in the form of the invention shown in FIGS. 6 and 7, is shown fastened on the sleeve portion 134 and the hub member 136 in the same manner as in FIGS. 4 and 5, i.e., by the press fitting of a serrated center bore opening 114 in the flange 18 over the reduced diameter end portion 116 on the inner end of the softer composition hub sleeve portion 134, and the swaging of a thin annular lip or ring portion 122 on the inner end of the hub sleeve portion 134 over a chamfered edge 120 of the bore opening 114 in the seal flange 18. This swaging operation completes the assembly of the roller and hub members 132, 136 with the cap seal flange member 18 to form the completed self-contained unitary roller wheel assembly 130.

Figure 8:
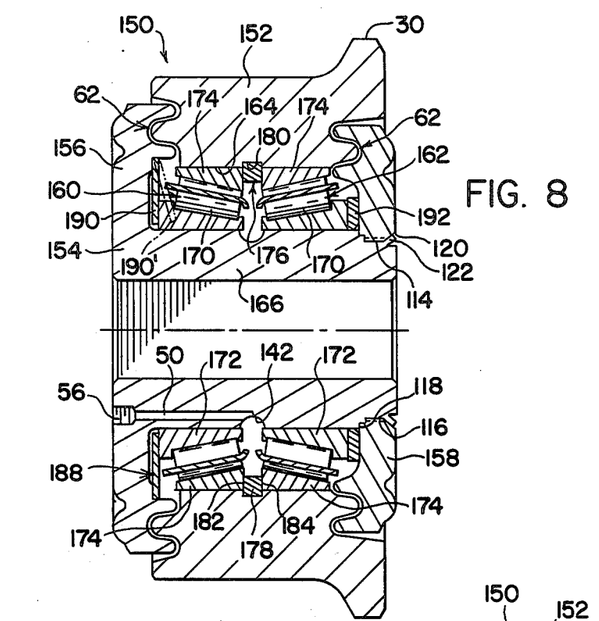
FIGS. 8 and 9 are axial sections of two further modified forms of the invention.

In the preferred embodiment of the invention illustrated in FIG. 8, the roller wheel assembly 150 there shown is generally similar to that shown in FIGS. 4 and 5 except that the roller member 152 in this case is rotatably supported on the hub member 154, between the seal flange 156 at one end thereof and the inner cap seal flange 158 fastened on the other end, by means of antifriction bearings in the form of double-row roller bearings 160, 162 instead of by ball bearings 86, 88 as in FIGS. 4 and 5. For this purpose, the axial center bore opening 164 of the roller member 152 is made of sufficiently larger, e.g., around 1¼ inch or so larger diameter than the outside diameter of the sleeve portion 166 of the hub member 154 to accommodate the roller bearings 160, 162 therebetween. As shown, the roller bearings 160, 162 preferably are of the well-known tapered roller bearing type comprised of a plurality of tapered rolling elements or rollers 170 positioned between and rolling along inner cone and outer cup races 172 and 174, respectively, of ring-like form. The inner races 172 slidably fit over the sleeve portion 166 of the hub member 154 while the outer races 174 slidably fit within the bore 164 of the roller member 152 and engage the wall thereof.

Figure 9:
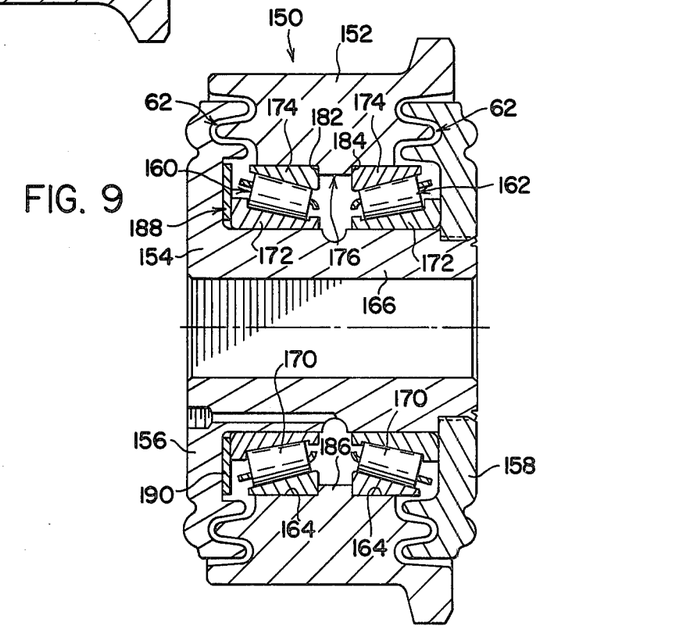

The roller member 152 is provided with suitable abutment means 176, located within the bore 164 more or less centrally thereof, against which the roller bearings 160, 162 are axially pressed and engaged to locate and maintain the roller member in a predetermined axial position on the hub member 154 axially centered between, and spaced the required distance from the seal flanges 156 and 158 to form the restricted labyrinth seal passageways 62 at each side of the roller member. The abutment means 176 is preferably constituted by at least one snap ring 178 which is snap locked into the wall of the bore 164, in predetermined fixed axial position therein, within annular groove means 180 in the bore wall and projecting radially inward therefrom to provide annular shoulders 182, 184 facing axially in opposite directions outward of the bore 164 and against which the roller bearings 160, 162 abut. Of course, a separate snap ring for each respective one of the roller bearings 160, 162 could be employed instead of the single snap ring 178 shown in FIG. 8. Also, instead of a snap ring 178, the abutment means 176 may be constituted, as shown in FIG. 9, by an internal integral annular rib or flange 186 formed on the wall of the bore 164 and projecting radially inward therefrom. The use of a snap ring 178, however, for the abutment means 176 is preferable over the use of such an integral flange 186 because it permits the formation of a single through bore opening 164 in the hub member 154 which thus assures dead concentricity between the two roller bearing seats on the roller member at opposite sides of the abutment means 176. The abutment means 176 also serves to space the two roller bearings 160, 162 axially apart at the region of the annular lubrication passageway 142 around the sleeve portion 166 of the hub member 154 so as to at least partially expose this passageway for communication with the space between the two roller bearings 160, 162 and thus permit the flow of lubrication grease into and through the roller bearings 160, 162 to the labyrinth seal passageways 62.

The roller bearings 160, 162 are forced axially inward of the bore 164 toward one another into abutting axial engagement with the shoulders 182, 184 of the abutment means 176 by suitable resilient or spring means 188 compressed between one of the seal flanges 156, 158 and the inner race 172 of the adjacent one of the roller bearings 160, 162. The resilient means 188 maintains a constant preload pressure on the roller bearings 160, 162 preferably amounting to around 200 lbs. nominal. The resilient means 188 preferably comprises a so-called disk or Bellville spring 190 which is of the general form of a dished washer and is preferably compressed between the seal flange 156 on the hub member 154 and the inner race 172 of the adjacent roller bearing 160, with the disk spring bearing around its outer peripheral region against the seal flange 156 and around its inner peripheral region, bordering the axial center bore opening thereof, against the inner race 172 of the bearing 160. In this connection, it will be understood that for a given compressive force applied in one axial direction by the disk spring 190 to the outer roller bearing 160, to force it axially inward of the bore 164 against the abutment shoulder 182 of the abutment means 176, an equal and opposite force is transmitted through the hub member 154 and the inner cap seal flange 158 and applied in the opposite direction by this flange 158 to the inner roller bearing 162 to likewise force it axially inward of the bore 164 and against the abutment shoulder 184 of the abutment means 176. Where necessary in order to afford sufficient clearance in the roller wheel assembly 150 between the inner roller bearing 162 and the inner cap seal flange member 158, a spacer washer 192 of the required thickness may be positioned on the sleeve portion 166 of the hub member 154, at a location inserted between the cap seal flange member 158 and the inner race 172 of the innermost roller bearing 162, for transmitting thereto the compressive force of the resilient means 188 applied to the wahser 192 by the inner cap seal flange member 158.

The resilient or spring means 188 is designed with load-deflection characteristics which will result in the application of the desired bearing preload pressure of around 200 lbs. nominal to the roller bearings 160, 162 when the hub member 154 and inner cap seal flange member 158 are fastened together in their final assembled axial position relative to one another, with the flange member 158 abutted against the annular stop shoulder 118 on the hub member as by the staking of the annular lip portion 122 on the hub member over the chamfered edge 120 of the flange member 158. Where the resilient means 188 is constituted by a disk spring 190, as shown, the spring in such case is designed with a thickness and load-deflection characteristics such that it will exert the desired axial preload pressure of around 200 lbs. nominal on the roller bearings 160, 162 and will be compressed from its initial cupped free height position shown in dash-dot lines at 190' in FIG. 8 to a fully compressed flattened washer-like shape as shown in solid lines in FIG. 8 when the hub member 154 and inner cap seal flange member 158 are fastened together in their final assembled axial position relative to one another as described above.

The invention has been described with reference to preferred embodiments. Obviously, modifications and alternations will occur to others upon a reading and understanding of this specification, and it is my intention to include such modifications and alternations insofar as they come within the scope of the appended claims.

Having thus described the invention, it is claimed:

1. A self-contained unitary conveyor roller wheel assembly comprising a hub member having an outturned seal flange at one end, an inner cap seal flange member mounted on the other end of said hub member and extending radially outward therefrom, and a roller member rotatably supported on said hub member between the said flanges, each of said members being constituted by a molded body of sintered powder metal, interengaging means on and locking said hub and cap seal flange members together in predetermined fixed axial relation against both axial and rotative movement relative to one another and in fixed axial relation to said roller member as a unitary assembly therewith, said hub member having at least a portion of its axial extent of reduced outside diameter between its ends forming at least in part an annular passageway therearound, and said hub member further having a lubrication bore extending in a straight line from an end face thereof to and communicating with said passageway through a surface of said reduced diameter portion.

2. A conveyor roller wheel assembly as specified in claim 1, wherein the said roller member and said hub member are provided with cooperating journal bearing surfaces rotatably supporting the roller member on said hub member, and wherein the said journal bearing surfaces are formed with the said annular passageway therebetween located intermediate their ends.

3. A conveyor roller wheel assembly as specified in claim 2, wherein the said reduced diameter hub portion is constituted by an annular groove extending therearound and forming the said annular passageway between the said journal bearing surfaces.

4. A conveyor roller wheel assembly as specified in claim 1 and comprising, in addition, anti-friction bearings comprising rolling elements rotatably supporting said roller member on said hub member.

5. A conveyor roller wheel assembly as specified in claim 4 wherein the said anti-friction bearings also form end thrust bearings for said roller member.

6. A conveyor roller wheel assembly as specified in claim 4, wherein the said anti-friction bearings comprise a pair of ball bearings.

7. A conveyor roller wheel assembly as specified in claim 6, wherein the said ball bearings have outer race bearing surfaces of angle contact form constituted by surface portions of said roller member.

8. A conveyor roller wheel assembly as specified in claim 4, wherein the said anti-friction bearings comprise a pair of roller bearings spaced axially of said hub member, and said annular passageway around the hub member communicates with the space between the said axially spaced roller bearings.

9. A conveyor roller wheel assembly as specified in claim 4, wherein the said anti-friction bearings are comprised of double-row tapered roller bearings spaced axially of said hub member, and said annular passageway around the hub member communicates with the space between the said axially spaced roller bearings.

10. A conveyor roller wheel assembly as specified in claim 9 and comprising, in addition, abutment means on said roller member located between said roller bearings, and means resiliently clamping said roller bearings axially against said abutment means to exert a constant preload end thrust pressure on said roller bearings and maintain said roller member in predetermined axially spaced relation to said seal flanges.

11. A conveyor roller wheel assembly as specified in claim 10, wherein the said means resiliently clamping said roller bearings axially against said abutment means comprises resilient means compressed between one of said seal flanges and the adjacent one of said tapered roller bearings.

12. A conveyor roller wheel assembly as specified in claim 11, wherein said resilient means comprises a disk spring.

13. A conveyor roller wheel assembly as specified in claim 11, wherein said roller member is provided with an axial center bore therethrough within which the said roller bearings are located and the wall of which is engaged with the said roller bearings to rotatably support the roller member in place on said hub member, and wherein the said abutment means comprises projecting shoulder means on said bore wall extending radially inward therefrom.

14. A conveyor roller wheel assembly as specified in claim 13, wherein the said abutment means comprises at least one snap ring in snap-locked engagement with the said bore wall within annular groove means therein and projecting radially inward into the said bore.

15. A conveyor rolller wheel assembly comprising a hub member hving an outturned seal flange at one end, a separately formed cap seal flange fixedly secured to the other end of said hub member and extending outwardly therefrom, and a roller member rotatably supported on said hub member between the said flanges, said hub member having at least a portion of reduced diameter between its ends and further having a lubrication passageway extending from an end face of the hub member and communicating with said reduced diameter hub portion through a surface thereof, the said roller member and said hub member being provided with cooperating journal bearing surfaces rotatably supporting the roller member on said hub member and having an annular passageway therebetween located intermediate their ends and extending therearound, said passageway being constituted at least in part by said reduced diameter hub portion, the said cooperating journal bearing surfaces being correspondingly stepped to a different diameter at a location between their opposite ends to provide step shoulders thereon spaced apart to form the said annular passageway between said journal bearing surfaces.

16. A self-contained unitary conveyor roller wheel assembly comprising a hub member having an outturned outer seal flange at one end, an inner cap seal flange member mounted on the other end of said hub member and extending radially outward therefrom, and a roller member rotatably supported on said hub member between said flanges, each of said members being constituted by a molded body of sintered powder metal, said hub member having at least a portion of its axial extent of reduced outside diameter between its ends forming at least in part an annular lubricant reservoir passageway therearound and a lubricant supply bore extending in a straight line from an end face of said hub member to and communicating with said passageway, said roller member and seal flanges having at least portions of their respective opposing side faces shaped as molded to form complementary wall portions of respective labyrinth seal passageways of restricted cross section therebetween at each side of said roller member and extending annularly therearound and of tortuous configuration radially of the conveyor wheel assembly for retaining a lubricant therein, and interengaging means on and locking said hub and cap seal flange members together in predetermined fixed axial relation against both axial and rotative movement relative to one another and in fixed axial relation to said roller member as a unitary assembly therewith.

17. A conveyor roller wheel assembly as specified in claim 16 wherein the said labyrinth seal passageways are formed by a plurality of spacially interfitting annular ribs and grooves on the facing side surfaces of said roller member and said seal flanges.

18. A conveyor roller wheel assembly as specified in claim 17, wherein the said annular ribs and grooves are respectively formed on said seal flanges and on said roller member.

19. A conveyor roller wheel assembly as specified in claim 18, wherein the outer faces of the said inner and outer seal flanges are formed with annular grooves extending therearound approximately opposite the said annular ribs thereon to afford a more uniform wall thickness for the said flanges throughout their radial extent.

20. A conveyor roller wheel assembly as specified in claim 16 and comprising, in addition, anti-friction bearings comprising rolling elements rotatably supporting said roller member on said hub member.

21. A conveyor roller wheel assembly as specified in claim 20, wherein the said anti-friction bearings comprise a pair of ball bearings.

22. A conveyor roller wheel assembly as specified in claim 20, wherein the said anti-friction bearings also form end thrust bearings for said roller member.

23. A conveyor roller wheel assembly as specified in claim 22, wherein the said anti-friction bearings comprise a pair of ball bearings.

24. A conveyor roller wheel assembly as specified in claim 23, wherein the said ball bearings have outer race bearing surfaces of angle contact form constituted by surface portions of said roller member.

25. A conveyor roller wheel assembly as specified in claim 20, wherein the said anti-friction bearings comprise a pair of roller bearings spaced axially of said hub member, and said annular passageway around the hub member communicates with the space between the said axially spaced roller bearings and with the said labyrinth seal passageways.

26. A conveyor roller wheel assembly as specified in claim 20, wherein the said anti-friction bearings are comprised of double-row tapered roller bearings spaced axially of said hub member, and said annular passageway around the hub member communicates with the space between the said axially spaced roller bearings and with the said labyrinth seal passageways.

27. A conveyor roller wheel assembly as specified in claim 26 and comprising, in addition, abutment means on said roller member located between said roller bearings, and means resiliently clamping said roller bearings axially against said abutment means to exert a constant preload end thrust pressure on said roller bearings and maintain said roller member in predetermined axially spaced relation to said seal flanges.

28. A conveyor roller wheel assembly as specified in claim 27 wherein the said means resiliently clamping said roller bearings axially against said abutment means comprises resilient means compressed between one of said seal flanges and the adjacent one of said tapered roller bearings.

29. A conveyor roller wheel assembly as specified in claim 28 wherein said resilient means comprises a disk spring.

30. A conveyor roller wheel assembly as specified in claim 27 wherein said roller member is provided with an axial center bore therethrough within which the said roller bearings are located and the wall of which is engaged with the said roller bearings to rotatably support the roller member in place on said hub member, and wherein the said abutment means comprises projecting shoulder means on said bore wall extending radially inward therefrom.

31. A conveyor roller wheel assembly as specified in claim 30 wherein the said abutment means comprises at least one snap ring in snap-locked engagement with the said bore wall within annular groove means therein and projecting radially inward into the said bore.

32. A conveyor roller wheel assembly as specified in claim 30 wherein the said abutment means comprises a single snap ring in snap-locked axial fixed engagement with the said bore wall within an axial groove therein and projecting radially into the said bore, and said resilient means comprises a disk spring compressed between the said outer seal flange on said hub member and the adjacent one of said tapered roller bearings.

33. A conveyor roller wheel assembly as specified in claim 16, wherein the said roller member and said hub member are provided with cooperating journal bearing surfaces rotatably supporting the roller member on said hub member, and wherein the said journal bearing surfaces are formed with the said annular lubricant reservoir passageway therebetween located intermediate their ends.

34. A conveyor roller wheel assembly as specified in claim 33, wherein the said reduced diameter hub portion is constituted by an annular groove extending therearound and forming the said annular passageway between the said journal bearing surfaces.

35. A conveyor roller wheel assembly as specified in claim 33, wherein the said journal bearing surface of said roller member is formed with at least one lubricant feeder passageway therein extending from the said annular passageway to the opposite ends of said journal bearing surface.

36. A conveyor roller wheel assembly comprising a hub member having an outturned outer seal flange at one end, a separately formed inner cap seal flange fixedly secured to the other end of said hub member and extending outwardly therefrom, and a roller member rotatably supported on said hub member between said flanges, said hub member having at least a portion of reduced diameter between its ends forming at least in part a lubricant reservoir passageway and a lubricant supply passageway extending from said reduced diameter portion to an end face of said hub member, and said roller member and seal flanges having at least portions of their respective opposing side faces shaped to form labyrinth seal passageways of restricted cross section therebetween extending annularly therearound and of tortuous configuration radially of the conveyor wheel assembly for retaining a lubricant therein, the said opposing side faces of said roller member and said seal flanges being formed with cooperating end thrust bearing surface portions radially inward of said labyrinth seal passageways and engageable to maintain the roller member in place on said hub member against endwise movement thereon.

37. A conveyor roller wheel assembly as specified in claim 36, wherein the said roller member and said hub member are provided with cooperating journal bearing surfaces rotatably supporting the roller member on said hub member and said journal bearing surfaces are formed with the said annular lubricant reservoir passageway therebetween located intermediate their ends.

38. A conveyor roller wheel assembly as specified in claim 37, wherein the said reduced diameter hub portion is constituted by an annular groove extending therearound and forming the said annular passageway between the said journal bearing surfaces.

39. A conveyor roller wheel assembly comprising a hub member having an outturned outer seal flange at one end, a separately formed inner cap seal flange fixedly secured to the other end of said hub member and extending outwardly therefrom, and a roller member rotatably supported on said hub member between said flanges, said hub member having at least a portion of reduced diameter between its ends forming at least in part a lubricant reservoir passageway and a lubricant supply passageway extending from said reduced diameter portion to an end face of said hub member, and said roller member and seal flanges having at least portions of their respective opposing side faces shaped to form labyrinth seal passageways of restricted cross section therebetween extending annularly therearound and of tortuous configuration radially of the conveyor wheel assembly for retaining a lubricant therein, the said roller member and said hub member being provided with cooperating journal bearing surfaces rotatably supporting the roller member on said hub member, said journal bearing surfaces having an annular lubricant reservoir passageway therebetween located intermediate their ends and extending therearound, said annular passageway being constituted at least in part by said reduced diameter hub portion, the said cooperating journal bearing surfaces being correspondingly stepped to a different diameter at a location between their opposite ends to provide step shoulders thereon spaced apart to form the said annular lubricant reservoir passageway between said journal bearing surfaces.

40. A conveyor roller wheel assembly comprising a hub member having an outturned outer seal flange at one end, a separately formed inner cap seal flange fixedly secured to the other end of said hub member and extending outwardly therefrom, and a roller member rotatably supported on said hub member between said flanges, said hub member having at least a portion of reduced diameter between its ends forming at least in part a lubricant reservoir passageway and a lubricant supply passageway extending from said reduced diameter portion to an end face of said hub member, and said roller member and seal flanges having at least portions of their respective opposing side faces shaped to form labyrinth seal passageways of restricted cross section therebetween extending annularly therearound and of tortuous configuration radially of the conveyor wheel assembly for retaining a lubricant therein, the said roller member and said hub member being provided with cooperating journal bearing surfaces rotatably supporting the roller member on said hub member, said journal bearing surfaces having an annular lubricant reservoir passageway therebetween located intermediate their ends and extending therearound, said annular passageway being constituted at least in part by said reduced diameter hub portion, the said opposing side faces of said roller member and seal flanges being formed with cooperating end thrust bearing surface portions radially inward of said labyrinth seal passageways and engageable to maintain the roller member in place on said hub member against endwise movement thereon, and the said journal and end thrust bearing surfaces of said roller member being formed with at least one lubricant feeder passageway therein extending from the said annular passageway to the opposite ends of said journal bearing surface and thence radially outward of said roller member across the respective end thrust bearing surfaces thereof and into communication with the said labyrinth seal passageways.

41. A self-contained unitary conveyor roller wheel assembly comprising a hub member having an outturned outer seal flange at one end, a separately formed inner cap seal flange fixedly secured to the other end of said hub member against axial and rotativve movement thereon and extending radially outward therefrom, and a roller member rotatably supported on said hub member between said flanges, said hub member having at least a portion of its axial extent of reduced diameter between its ends forming at least in part an annular lubricant reservoir passageway therearound and a lubricant supply bore extending in a straight line from an end face of said hub member to and communicating with said passageway, and said roller member and seal flanges having at least portions of their respective opposing side faces shaped to form labyrinth seal passageways of restricted cross section therebetween extending annularly therearound and of tortuous configuration radially of the conveyor wheel assembly for retaining a lubricant therein, the said hub member being stepped down at its said other end to form an annular end portion of reduced diameter extending from an annular step shoulder thereon, said inner cap seal flange being formed with a serrated circular center opening press fitted over the said annular end portion on said hub member to cut intermeshing serrations therein locking said inner cap seal flange and hub member against relative rotation, and an outer peripheral lip portion of the said shouldered other end of said hub member being peened over the outward side of said inner cap seal flange to stake it securely in place on said hub member abutting against the step shoulder formed thereon by said reduced diameter annular end portion.

42. A conveyor roller wheel assembly as specified in claim 41 wherein the said hub member is made of dead soft powder iron and said inner cap seal flange is made of hardened powder steel.

* * * * *

UNITED STATES PATENT AND TRADEMARK OFFICE
CERTIFICATE OF CORRECTION

PATENT NO. : 4,199,052
DATED : April 22, 1980
INVENTOR(S) : James C. Morris

It is certified that error appears in the above-identified patent and that said Letters Patent are hereby corrected as shown below:

Col. 6, line 51, "of" first occurrence should read -- or --. Column 9, line 43, "passageway" should read -- passageways --; line 45, "and" should read -- of --. Column 10, lines 21 and 51, "62" should read -- 68 --. Claim 13, column 12, line 63, "11" should read -- 10 --. Claim 15, column 13, line 8, "rolller" should read -- roller --. Claim 37, column 15, line 55, after "member" insert a comma (,). Claim 41, column 16, line 67, "rotativve" should read -- rotative --.

Signed and Sealed this

Twelfth Day of August 1980

[SEAL]

Attest:

SIDNEY A. DIAMOND

Attesting Officer

Commissioner of Patents and Trademarks